United States Patent Office 3,660,289
Patented May 2, 1972

3,660,289
REACTION PRODUCT OF POLYAMINE AND CARBOXYLIC ACIDS, AND FUELS, LUBRICATING OILS, GREASES AND PLASTICS CONTAINING SAID PRODUCT
Henryk A. Cyba, Evanston, Ill., assignor to Universal Oil Products Company, Des Plaines, Ill.
No Drawing. Filed May 15, 1970, Ser. No. 37,941
Int. Cl. C10m 1/30, 1/32; C10l 1/22
U.S. Cl. 252—51.5 A        16 Claims

ABSTRACT OF THE DISCLOSURE

Reaction product formed by the condensation of a polyamine containing at least two primary and/or secondary nitrogens, polyhalopolyhydropolycyclicdicarboxylic acid or derivative and halogen-free dicarboxylic acid or derivative. In one embodiment the reaction product is used as an additive in hydrocarbon oils and lubricants. In another embodiment it is used as an additive in plastics.

BACKGROUND OF THE INVENTION

In lubricating oils, for example, various additives are incorporated to serve as detergents, dispersants, extreme pressure additives, stabilizers, corrosion inhibitors, acidity neutralizers, etc., and a variety of compounds and reaction products have proposed in the prior art for this purpose. Included in the myriad of compounds heretofore proposed are the reaction products of certain acids and amines. Similarly, for use in plastic, a voluminous number of compounds of diverse chemical composition have been proposed. For imparting flame proof properties to the plastic, one type of compound proposed is halogen containing. For use as a curing agent or catalyst, numerous nitrogen containing compounds, among others have been proposed heretofore.

DESCRIPTION OF THE INVENTION

The present invention discloses a novel reaction product. The novel reaction product is of varied utility and is particularly useful as an additive to hydrocarbon oils, to lubricants and to plastics.

As will be hereinafter described in detail, the reaction product will comprise a polyimide, polyamide or mixture thereof, depending primarily on the particular polyamine utilized as a reactant which, in turn, will be selected with regard to the particular utility of the reaction product and also will be dependent upon the particular halogen-free dicarboxylic acid selected for use as a reactant.

In one embodiment the present invention relates to the reaction product formed by the condensation at a temperature of from about 175° to about 500° F. of (a) a polyamine containing at least two primary nitrogens, at least two secondary nitrogens or a mixture thereof (b) a polyhalopolyhydropolycyclicdicarboxylic acid, corresponding anhydride or ester of said acid and (c) a halogen-free dicarboxylic acid, corresponding anhydride or ester of the last mentioned acid.

In another embodiment the present invention relates to the use of the reaction product as an additive in organic substances. In one example the organic substance is hydrocarbon oil. In another example, the organic substance is a lubricant, including lubricating oil and grease, which may be of mineral origin or synthetically prepared. In still another embodiment the reaction product is used as an additive in plastic, textile, etc. requiring flame proofing properties, as well as for use as a curing agent or catalyst.

As hereinbefore set forth, the reaction product of the present invention is prepared when using a particular polyamine as a reactant. The polyamine must contain at least two primary and/or secondary nitrogens. The polyamine may contain any suitable number of nitrogen atoms per molecule and generally will contain from 2 to about 6 nitrogen atoms per molecule. Illustrative polyamines include ethylenediamine, propylenediamine, butylenediamine, pentylenediamine, hexylenediamine, heptylenediamine, octylenediamine, etc., diethylenetriamine, dipropylenetriamine, dibutylenetriamine, dipentylenetriamine, dihexylenetriamine, diheptylenetriamine, dioctylenetriamine, etc., triethylenetetraamine, tripropylenetetraamine, tributylenetetraamine, tripentylenetetraamine, trihexylenetetraamine, triheptylenetetraamine, trioctylenetetraamine, etc., tetraethylenepentaamine, tetrapropylenepentaamine, tetrabutylenepentaamine, tetrahexylenepentaamine, tetraheptylenepentaamine, tetraoctylenepentaamine, etc., pentaethylenehexaamine, pentapropylenehexaamine, pentabutylenehexaamine, pentapentylenehexaamine, pentahexylenehexaamine, pentaheptylenehexaamine, pentaoctylenehexaamine, etc., and these polyamines in which one or more of the nitrogen atoms is substituted with a hydrocarbon group, which may be aliphatic and particularly alkyl of from 1 to 25 or more carbon atoms, aryl and particularly phenyl or naphthyl and/or cycloalkyl containing from 4 to 12 carbon atoms in the ring. It is understood that the polyamine contains at least two primary and/or secondary nitrogen atoms.

Examples of diamines containing one primary and one secondary nitrogen atoms are N-alkyl-diaminoalkanes. A particularly preferred amine in this class is N-alkyl-1,3-diaminopropane in which the alkyl group is derived from a fatty acid and contains from 8 to about 25 carbon atoms. A number of N-alkyl-diaminoalkanes in this class are available commercially, such as "Duomeen T" and "Diam 26" in which the alkyl group is derived from tallow and contains from about 12 to about 20 carbon atoms per group and mostly 16 to 18 carbon atoms per group. While the N-alkyl-1,3-diaminopropanes are preferred, it is understood that other suitable N-alkyl-diaminoalkanes may be employed. Illustrative examples include N-alkyl-1,2-diaminoethane,
N-alkyl-1,2-diaminopropane,
N-alkyl-1,2-diaminobutane,
N-alkyl-1,3-diaminobutane,
N-alkyl-1,4-diaminobutane,
N-alkyl-1,2-diaminopentane,
N-alkyl-1,3-diaminopentane,
N-alkyl-1,4-diaminopentane,
N-alkyl-1,5-diaminopentane,
N-alkyl-1,2-diaminohexane,
N-alkyl-1,3-diaminohexane,
N-alkyl-1,4-diaminohexane,
N-alkyl-1,5-diaminohexane,
N-alkyl-1,6-diaminohexane, etc.

Other suitable polyamines are phenylenediamines, naphthylenediamines, diaminodiphenyl amines, diaminodiphenyl alkanes in which the alkane moiety contains from 1 to 6 carbon atoms, diaminodiphenyl sulfides and diaminodiphenyl ethers, in which each phenyl nucleus may or may not contain 1 to 3 alkyl groups of 1 to 6 carbon atoms attached thereto and in which one terminal nitrogen atom may contain a hydrocarbon substituent, the substituent being selected from aliphatic, aryl or cycloaliphatic groups. When the nitrogen atoms are unsubstituted, the aryl diamine will contain 2 primary nitrogens. When one or both of the terminal nitrogen atoms contains a hydrocarbon substituent, the aryl diamine will contain either 1 primary and 1 secondary or 2 secondary nitrogens.

In still another embodiment the polyamine comprises a cycloalkyl diamine and particularly cyclohexyl diamine. Other cycloalkyl diamines include cyclobutyl diamine, cyclopentyl diamine, cycloheptyl diamine, cyclooctyl diamine, cyclononyl diamine, cyclodecyl diamine, cycloundecyl diamine, cyclododecyl diamine, etc. and those in which one of the nitrogen atoms contains a hydrocarbyl substituent, the substituent being selected from those hereinbefore set forth.

As will be hereinafter described in detail, the particular amine will be selected with regard to the use intended for the reaction product. Accordingly, it is understood that the various amines are not necessarily equivalent for all utilities and also that a mixture of amines may be used.

As hereinbefore set forth another reactant used in preparing the reaction product is a polyhalopolyhydropolycyclic dicarboxylic acid or derivative. In a preferred embodiment the acid or anhydride thereof is used. In one embodiment the acid or anhydride is of the type known in the art as "Chlorendic" or "HET" acid or anhydride. This acid is prepared by the Diels-Alder addition reaction of maleic acid and hexachlorocyclopentadiene or more conveniently by the reaction of maleic anhydride and hexachlorocyclopentadiene to form the corresponding anhydride and then hydrolyzed to form the acid. The corresponding anhydride is prepared by the reaction of maleic anhydride and hexachlorocyclopentadiene. This acid or anhydride also may be named 1,4,5,6,7,7-hexachlorobicyclo-(2.2.1)-5-heptene - 2,3 - dicarboxylic acid or the corresponding anhydride. These compounds are prepared by the reaction of equal molar quantities of the reactants, generally by refluxing preferably at about 350° F. in the presence of a solvent. These reactions are well known in the art and are described, for example, in U.S. Pat. 2,606,910 and elsewhere.

In place of maleic acid or maleic anhydride, it is understood that other suitable dicarboxylic acids containing carbon to carbon unsaturation may be employed. Illustrative examples include fumaric acid, itaconic acid, citraconic acid, glutaconic acid, etc. Also, in place of hexachlorocyclopentadiene, other suitable halo-substituted cycloalkadienes may be used. Illustrative examples include 1,2 - dichlorocyclopentadiene, 1,5 - dichlorocyclopentadiene, 1,2,3-trichlorocyclopentadiene, 1,2,3,4 - tetrachlorocyclopentadiene, 1,2,3,4,5 - pentachlorocyclopentadiene and similar compounds in which all or part of the chlorine is replaced by other halogen and particularly bromine.

A particularly preferred polyhalopolyhydropolycyclicdicarboxylic acid or anhydride is prepared by the Diels-Alder condensation of a conjugated aliphatic diene with an olefinic dicarboxylic acid and then further condensing the resultant cyclohexenedicarboxylic acid with a halocycloalkadiene. A specifically preferred reaction product is the Diels-Alder condensation of 1,3-butadiene with maleic anhydride to form 1,2,3,6-tetrahydrophthalic anhydride, followed by the Diels-Alder condensation with hexachlorocyclopentadiene. The product may be named 5,6,7,8,9,9-hexachloro - 1,2,3,4,4a,5,8,8a - octahydro-5,8-methano-2,3-naphthalenedicarboxylic anhydride, hereinafter referred to as A anhydride. The corresponding acid is prepared preferably by starting with maleic anhydride as above and hydrolyzing the formed A anhydride to the A acid. The acid may be named 5,6,7,8,9,9-hexachloro-1,2,3,4,4a,5,8,8a-octahydro - 5,8 - methano-2,3-naphthalene-dicarboxylic acid, hereinafter referred to as A acid. Here again, other conjugated aliphatic dienes may be used including, for example, 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene, conjugated nonadienes, etc. halodienes as, for example, chloroprene and particularly 1-chlorobutadiene and 1,4-dichlorobutadiene. Similarly, other unsaturated dicarboxylic acids may be used including fumaric acid, itaconic acid, citraconic acid, glutaconic acid, mesaconic acid, etc. Also, other halocycloalkadienes may be used including, for example, those specifically hereinbefore set forth. The preparation of these compounds also is known in the art and is set forth in detail in U.S. Pat. 3,017,431.

Still another preferred polyhalopolyhydropolycyclicdicarboxylic acid or anhydride is prepared by condensing cyclopentadiene with maleic acid or maleic anhydride to form norborn-5-ene-2,3-dicarboxylic acid or anhydride and then condensing the same with hexachlorocyclopentadiene. The product may be named 5,6,7,8,9,9-hexachloro-1,2,3,4,4a,5,8,8a - octahydro - 1,4,5,8 - dimethano-2,3-naphthalenedicarboxylic acid or anhydride, hereinafter referred to as B acid B anhydride respectively. Here again, it is understood that other conjugated cycloaliphatic dienes, other unsaturated dicarboxylic acids or anhydrides and other polyhalocycloalkadienes may be used to prepare suitable polyhalopolyhydropolycyclicdicarboxylic acids or anhydrides.

From the above, it will be seen that any suitable polyhalopolyhydropolycyclicdicarboxylic acid or anhydride may be used in accordance with the present invention. The polyhalopolyhydropolycyclicdicarboxylic acid may be illustrated by the following general structure:

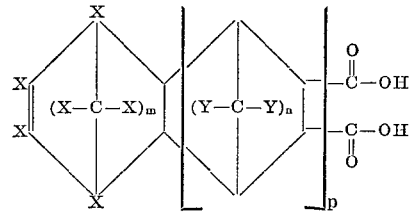

in which X is selected from the group consisting of halogen and particularly chlorine and/or bromine, hydrogen and an alkyl radical of from one to ten and preferably from one to four carbon atoms, at least two of the X's being halogen, Y is selected from the group consisting of halogen, hydrogen and an alkyl radical of one to ten and preferably from one to four carbon atoms, $m$ is an integer of from one to four, $n$ ranges from zero to four and $p$ ranges from zero to four.

The above structure illustrates the dicarboxylic acid. In the interest of simplicity, the corresponding anhydride is not being illustrated, but is readily ascertainable from the above structure.

Referring to the above structure, when X is chlorine, $m$ is one, $n$ is zero and $p$ is zero, the compound is 1,4,5,6,7,7 - hexachloro - bicyclo - (2.2.1)-5-heptene-2,3-dicarboxylic acid or the corresponding anhydride. Similarly, when X is chlorine, $m$ is one, $n$ is zero and $p$ is one, the compound is 5,6,7,8,9,9-hexachloro-1,2,3,4,4a,5,8,8a-octahydro-5,8-methano-2,3-naphthalenediacrboxylic acid or the corresponding anhydride. Also, when X is chlorine, Y is hydrogen, $m$ is one, $n$ is one and $p$ is one, the compound is 5,6,7,8,9,9-hexachloro-1,2,3,4,4a,5,8,8a-octahydro-1,4,5,8-dimethano-2,3-naphthalene-dicarboxylic acid or the corresponding anhydride.

While the particular acid or anhydride set forth above is preferred, it is understood that an ester of the acid may be used for reacting with the alkanolamine. Any suitable ester may be used and is prepared by reacting the acid or anhydride with an alcohol under conditions to liberate water. While the alcohol may contain from one to eighteen carbon atoms, it preferably contains one to four carbon atoms. Illustrative alcohols include methanol, ethanol, propanol, butanol, pentanol, hexanol, etc.

As hereinbefore set forth another reactant is a halogen-free decarboxylic acid, corresponding anhydride or ester. In one embodiment the acid is a saturated dibasic acid as illustrated by oxalic acid, malonic acid, succinic acid, glutaric acid, adipic acid, pimelic acid, suberic acid, azelaic acid, sebacic acid, etc. In another embodiment the acid is an unsaturated acid including maleic acid, fumaric acid, itaconic acid, citraconic acid, glutaconic acid, etc. In place of the acid, the anhydride may be used, as well as the ester which is prepared by reacting the acid or anhydride with an alcohol under conditions to liberate water. Here again, the alcohol preferably contains from 1 to 4 carbon atoms.

In another embodiment and particularly when the reaction product is used as an additive in lubricating oil, grease or the like, the halogen-free dicarboxylic acid is an aliphatic substituted dicarboxylic acid containing from 4 to 80 carbon atoms in the aliphatic substitution. Here again, it is understood that the corresponding anhydride or ester may be used. In one embodiment the aliphatic substituent is an alkenyl group and the preferred reactant comprises an alkeny lacid anhydride, as, for example, dodecenyl-succinic anhydride. Other alkenyl acid anhydrides include butenyl-succinic anhydride, pentenyl-succinic anhydride, hexenyl-succinic anhydride, heptenyl-succinic anhydride, octenyl-succinic anhydride, nonenyl-succinic anhydride, decenyl-succinic anhydride, undecenyl-succinic anhydride, tridecenyl-succinic anhydride, tetradecenyl-succinic anhydride, pentadecenyl-succinic anhydride, hexadecenyl-succinic anhydride, heptadecenyl-succinic anhydride, octadecenyl-succinic anhydride, nonadecenyl-succinic anhydride, eicosenyl-succinic anhydride, and higher molecular weight alkenyl-succinic anhydrides.

In another particularly preferred embodiment for use in lubricating oil, grease or other high boiling substrate, the alkenyl substituent contains from 40 to 80 or more carbon atoms. These high molecular weight reactants contribute favorably to the solubility of the reaction product in the lubricating oil or other heavy substrate. The higher molecular weight alkenyl-acid anhydrides are prepared in any suitable manner and conveniently by reacting a high molecular weight polyolefin with maleic anhydride. The polyolefins are exemplified by the polymerization of ethylene, propylene, 1-butene, 2-butene, isobutene, pentene or mixtures thereof. The polyolefins preferably have a molecular weight of from about 700 to about 1400. The preparation of the polyolefins is well known in the art and a number thereof is available commercially. Accordingly such details of preparation are not necessary in the present application. Similarly, the reaction of the polyolefin with maleic anhydride is also well known in the prior art and in fact a number of these products is available commercially. In general the preparation of the alkenyl-succinic anhydride is effected at a temperature of from about 300° to about 500° F. by reacting maleic anhydride with the olefinic polymer in a mole ratio of about 1:1 to about 5:1 respectively. As mentioned above, the preparation of the high molecular weight alkenyl-acid anhydride is well known in the art and need not be described in detail herein.

While the alkenyl-succinic anhydrides are preferred, it is understood that the alkyl-succinic anhydrides may be employed, the alkyl groups containing from about 4 to about 80 carbon atoms and preferably corresponding to the alkenyl groups hereinbefore set forth. Similarly, while the aliphatic-succinic anhydrides are preferred, it is understood that the aliphatic substituted anhydride of other acids may be employed including, for example, aliphatic adipic anhydrides, aliphatic glutaric anhydrides, aliphatic pimelic anhydrides, aliphatic suberic anhydrides, etc.

The aliphatic substituted dicarboxylic acid is particularly preferred for use in the preparation of a composition designed for use in oils or grease. However, for use in plastics and polymers, such as rubber, ABS, acrylates, polystyrenes, polyesters, polyvinyls, polyolefins, etc., the unsubstituted dicarboxylic acid anhydrides are preferred. In this embodiment the reaction product serves to impart flame retardant properties to the plastic and in another embodiment serves as a curing agent for the plastics which undergo curing.

The derivatives prepared from the unsaturated dibasic acid, polyamine and polyhalopolyhydropolycyclicdicarboxylic acid or anhydride, by virtue of the unsaturation introduced via the unsaturated or polymerizable double bond present in the acid, are able to crosslink, copolymerize or graft with the basic polymer, resin, rubber or coating. This is especially useful in imparting flame retarding properties to the polymer, rubber or coating. The composition of the present invention thus is able to coreact or copolymerize with the substrate and to yield a product in which the flame retardant of the present invention is an integral part and cannot be washed out, lost by evaporation or exuded by sublimation or migration to the surface.

The polyamine, polyhalopolyhydropolycyclicdicarboxylic acid or derivative and halogen-free dicarboxylic acid or derivative are reacted in any suitable manner. These reactants are reacted in proportions of 1 to 2 basic equivalents per 1 to 2 acidic equivalents. The reaction generally is effected at a temperature above about 175° F. and preferably at a higher temperature, which usually will not exceed about 500° F., although higher or lower temperatures may be employed under certain conditions. The exact temperature will depend upon whether a solvent is used and, when employed, on the particular solvent. For example, with benzene as the solvent, the temperature will be of the order to 175° F., with toluene the temperature will be of the order to 250° F., and with xylene in order of 300–320° F. Other solvents include cumene, naphtha, Decalin, etc. Any suitable amount of the solvent may be employed but preferably should not comprise a large excess because this will tend to lower the reaction temperature and to slow the reaction. Water formed during the reaction may be removed in any suitable manner including, for example, by operating under reduced pressure, by removing an azeotrope of water-solvent, by distilling the reaction product at an elevated temperature, etc. When an ester of one or both of the acids is used, the corresponding alcohol will be liberated. A higher temperature may be utilized in order to remove the water or alcohol as it is being formed. The time of reaction is sufficient to effect the desired condensation and, in general, will range from one-half to about forty hours or more and preferably from about 6 to about 40 hours.

As hereinbefore set forth, the reaction product will vary with the particular reactants and the mole proportions thereof employed. In all cases the reaction product will comprise a polyimide, polyamide or a mixture thereof, and may also include other functional groups.

The following equation symbolizes probable reaction mechanism in the formation of an imide-amide reaction product. It is understood that this equation is for illustrative purposes only and that the polyimide or polyamide may be formed, as well as other reaction products. However, for the purposes of illustration, the two different most probable reactions are shown in the equation.

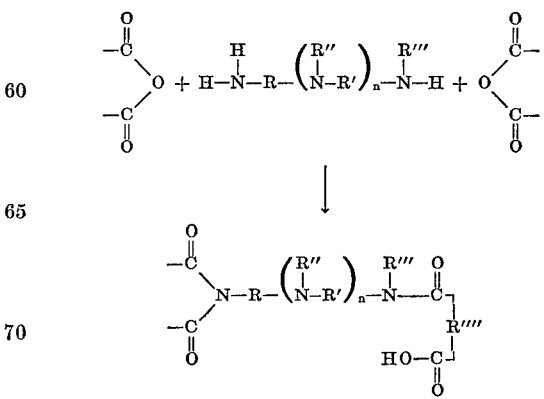

In the above equation R and R' are alkylene groups, each containing from 2 to 6 carbon atoms, R" and R''' are hydrogen or hydrocarbyl groups which may be selected from aliphatic containing from 1 to 20 or more carbon atoms, phenyl, or cycloalkyl containing from 4 to 12 carbon atoms in the ring, and R'''' represents the remaining moiety of the halogen-free dicarboxylic acid. In the equation, $n$ is an integer of from 0 to 20.

In the case illustrated above, the anhydride group at the left represents the polyhalopolyhydropolycyclicdicarboxylic acid anhydride and the anhydride moiety at the right represents the halogen-free dicarboxylic acid anhydride. In the reaction at the left, water is liberated with the formation of an imide. Where R''' is a hydrocarbyl substituent, the reaction at the right represents the formation of an amide. It is believed that the mechanism in the amide formation involves the attachment of the amino hydrogen to the anhydride oxygen to form a hydroxyl group, with the resultant splitting of the anhydride structure, and the nitrogen atom attaches to the other carbonyl group as illustrated in the reaction product of the equation. It will be noted that a carboxyl group is formed but it is believed that this is an intermediate product and will react with additional amine to form another amide configuration. When R''' is hydrogen, presumably the reaction at the right also will form an amide and thus the reaction product would be a polyimide. As hereinbefore set forth the reaction illustrated is but one of several possible reactions which may occur between the amino and carboxylic groups.

As hereinbefore set forth, when the reaction product is to be utilized as an additive in lubricants, the halogen-free dicarboxylic acid or derivative preferably contains a high molecular weight aliphatic substituent and thus the reaction product is readily soluble in the lubricant. Also, the number of nitrogen atoms preferably is three or more and thus there will be additional basicity available for neutralizing any acidity in the substrate. On the other hand, when the reaction product is used in plastic, the halogen-free dibasic acid preferably is unsubstituted and thus will not detract from the effect of the halogens to impart flame retardancy. The reaction product also will contain sufficient polarity from the nitrogens to serve as a curing agent or catalyst.

The reaction product generally is recovered as a viscous liquid when using aliphatic dibasic acids or as a solid when coreacting an unsaturated dibasic acid or derivative. It may be marketed and used as such or as a solution in a suitable solvent including, for example, saturated paraffinic hydrocarbons including pentane, hexane, heptane, octane, etc., aromatic hydrocarbons including benzene, toluene, xylene, cumene, Decalin, etc., alcohols, ketones, etc. However, when the product is recovered in the presence of a solvent or when the product is not sufficiently soluble in the substrate, the desired solubility may be obtained by dissolving the product in a mutual solvent. Suitable solvents for this purpose comprise phenols and particularly alkylphenols or polyalkylphenols in which the alkyl group or groups contain from six to twenty carbon atoms. The phenol may be used in a concentration of from about 5% and preferably from about 25% to about 500% by weight and, more particularly, from about 30% to about 200% by weight of the reaction product.

As hereinbefore set forth the reaction product in one embodiment is used as an additive in lubricants and functions as a detergent, dispersant, extreme pressure additive, as well as serving as a peroxide decomposer, corrosion inhibitor, rust inhibitor, antioxidant, etc. Other organic substrates which may be improved by the additive of the present invention, which serves one or more of the functions set forth above, include gasoline, naphtha, kerosene, jet fuel, lubricating oil, diesel fuel, fuel oil, residual oil, drying oil, grease, wax, resin, plastic, rubber, etc.

As hereinbefore set forth, in one embodiment the reaction product is used as an additive in lubricating oil. The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other oils include those of animal, marine or vegetable origin.

The lubricating oils generally have a viscosity within the range of from 10 SUS at 100° F. to 1000 SUS at 210° F. (SAE viscosity numbers include the range from SAE 10 to SAE 160). The petroleum oils are obtained from paraffinic, naphthenic, asphaltic or mixed base crudes. When highly paraffinic lubricating oils are used, a solubilizing agent also is used.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanoate), etc. The polyalkylene oxides include polyisopropylene oxide, polyisopropylene oxide diether, polyisopropylene oxide diester, etc. The silicones includes methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkane esters such as the esters of trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., and particularly triesters in which the ester portions each contain from three to twelve carbon atoms and may be selected from those hereinbefore specifically set forth in connection with the discussion of the neopentyl glycol esters, (3) complex esters composed of dibasic acids and glycols, especially neopentyl, neohexyl, etc., glycols further reacted or capped with monobasic acids or alcohols to give lubricants of viscosities at 210° F. of from four to twelve centistokes or higher, and (4) tricresylphosphate, trioctylphosphate, trinonylphosphate, tridecylphosphate, as well as mixed aryl and alkyl phosphates, etc.

The reaction product of the present invention also is used in greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acid as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

In another embodiment the reaction products of the present invention possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. The reaction products or mixture of these may be used for the control of various larvae, mites, eggs of mites and such insects as flour beetle, Mexican bean beetle, black carpet beetle, milkweed bug, German cockroaches, southern army worms, mealy bug, sow bug, citrus red spider, greenhouse red spider, various mosquitoes, yellow fever mosquito, malarial mosquito, houseflies, etc.

As hereinbefore set forth, the reaction products of the present invention also possess flame-proofing or flame retardant properties and therefore are useful in plastics, resins, coatings, paints, drying oils, etc., as well as in fibrous materials. Also, as hereinbefore set forth, the reaction products of the present invention serve as curing agents or catalysts.

The plastics and resins include polyolefins such as polyethylene, polypropylene, polybutylene, etc., mixed polymers prepared from two or more of ethylene, propylene and butylene, mixed polymers of one or more each of monoolefins and diolefins, polydiolefins including polybutadiene, polystyrene, polyvinylchloride, polycarbonate, ABS (acrylonitrile-butadiene-styrene polymer), polyphenyl ethers, polyphenyl ethers modified with styrene, polyesters, polyurethanes, epoxy resins, etc.

The concentration of the reaction product to be employed as an additive will depend upon the particular substrate in which it is to be used. In general, the additive is used in a concentration of from about 0.001% to about 25% by weight of the substrate and more specifically within the range of from about 0.01% to about 5% by weight of the substrate. When used in conventional lubricating oil, the additive generally may be employed in a concentration of from about 0.01% to about 2% by weight of the oil. When used in lubricating oil for more severe operations, such as hypoid gear oil, the additive is used in a concentration of from about 1% to about 20% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the additive of the present invention may be used along with other additives incorporated in the organic substrate. The other additive will depend upon the particular organic substrate. For example, in lubricating oil, the additional additives may comprise one or more of viscosity index improver, pour point depressant, anti-foam additive, detergent, corrosion inhibitor, antioxidant, etc. Preferred antioxidants are of the phenolic type and include tertiarybutylcatechol, 2,6-di-tertiarybutyl-4 - methylphenol, 2,4-dimethyl-6-tertiarybutylphenol, etc., 2-tertiarybutyl-4-methoxyphenol, 2 - tertiary-4-ethoxyphenol, 3,3',5,5'-tetratertiarybutyl-diphenylmethane, etc.

When desired, an emulsifying agent may be employed in formulations containing the additive of the present invention. Any suitable emulsifying agent can be used, including alkali metal sulfonates of petroleum solfonic acids, mahogany sulfonates, naphthenic acids, fatty acids, etc., fatty alcohol sulfonates, pentaerythritol oleates, laurates, etc. The amount of water used in the emulsified oils will depend upon the particular use of the emulsion and may range from 0.25% to 50% or even up to 98% by weight of the composition.

The additive of the present invention is incorporated in the substrate in any suitable manner and preferably the mixture is suitably agitated or otherwise mixed in order to obtain intimate admixing of the additive and of the substrate. When the substrate comprises a mixture of two or more components, the additives of the present invention may be commingled with one of the components prior to mixing with the remaining component or components of the substrate.

The following examples are introduced to illustrate further the novelty and utility of the present invention but not with the intention of unduly limiting the same.

EXAMPLE I

In this example, 156.8 g. (equivalent to ½ mole) of dodecenylsuccinic anhydride was mixed with 212.5 g. (equivalent to ½ mole) of "A" anhydride and dissolved in 400 g. of hot "Ansul" 141 (diethyleneglycol dimethyl ether) and 400 grams of toluene. This solution was then added slowly to refluxing ½ mole (51.5 grams) of diethylenetriamine dissolved in 200 grams of toluene. The additive was completed in three hours. After two hours of addition 12 cc. of water were collected. After a total of 5 hours of reflux, all water condensed in Dean Stark tube. The reaction mixture was decolorized partially with Norite A and all solvents were removed by evaporation under high vacuum at a maximum pot temperature of about 170° C. The residue was recovered as a resinous powder soluble in acetone and containing 4.85% of nitrogen and 25.6% chlorine. 355 grams of this product were recovered. A 50% solution of the product is found to be effective in Erdco coker evaluation test as a detergent-dispersant in fuel oil.

EXAMPLE II

The reaction product of this example is prepared by reacting 2 mole proportions of N-tallow-1,3-diaminopropane, 1 mole proportion of A anhydride and 1 mole proportion of polyisobutene-succinic anhydride, the polyisobutene moiety having an average molecular weight of about 1200. The reaction product is prepared by refluxing the above reactants in the presence of xylene solvent for about 6 hours, with the water of reaction being continuously removed. Following completion of the reaction, the reaction product is recovered in the xylene solvent and utilized in this manner as an additive.

EXAMPLE III

In this example, 30.0 g. (0.5 mole) of ethylene diamine were dissolved in 250 cc. of hot toluene. To this a warm soltuion of 0.5 mole of anhydride A (equivalent to 212.5 grams) and 0.5 mole of maleic anhydride (49.0 grams in 1450 cc. diethylene glycol dimethyl ether and 1450 cc. of toluene was added, while refluxing and collecting water in a Dean Stark tube. 15 cc. of water was collected within 8 hours. During distillation of the solution several precipitates started to form. The precipitates were filtered off and washed with toluene. The remaining residue of distillation was treated with ether, filtered off and dried. 48 g. of light tan product was obtained, containing 42.3% chlorine, 40.4% carbon and 2.9 hydrogen. The ether mother liquor yielded 65 g. of light tan powder containing 34.1% chlorine, 41.8% carbon and 3.5% hydrogen.

The above product containing 42.3% chlorine is blended with butadiene polymer and grafted together with styrene and acrylonitrile to yield an ABS resin containing about 5–7% chlorine which imparts flame proofing properties to the composition.

EXAMPLE IV

The reaction product of this example is prepared by reacting one mole proportion of dipropylenetriamine, one mole proportion of 1,4,5,6,7,7-hexachlorobicyclo-(2.2.1)-5-heptene-2,3-dicarboxylic acid anhydride and one mole proportion of maleic anhydride. The reaction is effected by refluxing the reactants in xylene solvent and continuously removing the water of reaction. Following completion of the reaction, the xylene solvent is removed under vacuum and the remaining solid containing over 40% chlorine is used as a flame retardant. This is accomplished by curing 20 p.p.h. (parts per hundred) of the reaction product together with 15 p.p.h. of antimony trioxide with EPDM rubber composition to render the same flame retarded.

EXAMPLE V

The reaction product of this example is prepared by reacting the ethyl ester of B acid (5,6,7,8,9,9-hexachloro - 1,2,3,4,4a,5,8,8a - octahydro - 1,4,5,8-dimethano-2,3-naphthalenedicarboxylic acid) with N-phenyl-diaminodiphenyl ether and sebacic acid. The ester is prepared by refluxing two mole proportions of the alcohol per one mole proportion of the acid anhydride. The ester, diaminodiphenylether and sebacic acid are refluxed in the presence of xylene solvent to liberate alcohol and water and to form the reaction product.

EXAMPLE VI

In one embodiment the reaction products of the present invention are used as additives in lubricating oil. One method of evaluating lubricating oils is by the Falex machine. This procedure is described in detail in a book entitled "Lubricant Testing" authored by E. G. Ellis and published by Scientific Publication (Great Britain) Limited, 1953, pages 150–154. Briefly, the Falex machine consists of a rotating pin which runs between two V shape bearings which are spring loaded against the pin and provided with means for varying the load. The oil to be tested is poured into a metal trough in which the pin and bearings are partly submerged. The machine is operated for five minutes each at 250 and 500 pound loads and then forty-five minutes at 750 pound load. The data collected include the temperature of the oil at each of the loads, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the coil.

In another series of tests the machine is operated for five minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

In one series of evaluations the lubricating oil is dioctyl sebacate synthetic lubricating oil marketed under the trade name of "Plexol 201." A control sample of the lubricating oil (not containing an additive) is evaluated in the above manner and underwent seizure at a load of 750 pounds. In contrast another sample of the synthetic lubricating oil containing 2% by weight of the reaction product prepared as described in Example II does not undergo seizure unit a load of greater than 1200 pounds.

EXAMPLE VII

Another series of evaluations is made in the same manner as described in Example VI except that the lubricating oil is a mineral oil marketed commercially as "Carnes 340 White Oil." When evaluated in the manner described in Example VI, the mineral oil undergoes seizure at a load of less than 500 pounds. In contrast another sample of the white oil containing 2% by weight of the reaction product prepared as described in Example II will not undergo seizure until a load of above 1200 pounds is attained.

EXAMPLE VIII

An insecticidal composition is prepared by dissolving 1 g. of the reaction product of Example III in 2 cc. of benzene and emulsifying the resultant solution with 100 cc. of water using Triton X–100 as the emulsifying agent. The resulting emulsion is sprayed into a cage containing houseflies and results in substantial knockdown.

EXAMPLE IX

In this example, 156.8 g. (½ mole) of dodecenyl succinic anhydride was mixed with 212.5 grams of "A" anhydride and dissolved in 400 g. of hot dimethylether of diethylene glycol. This solution then was added within 70 minutes to ½ mole (73 grams) of triethylenetetramine dissolved in 400 g. of toluene while refluxing and mixing. Water was continuously condensed in a Dean Stark tube. After the evolution of water subsided (23.5 cc. collected), the solvents were removed under vacuum at 130° C. 400 grams of a resin, soluble in acetone, were recovered. The resin analyzed 6.0% nitrogen and 24.3% chlorine. This resin is now neutralized with ditridecylmonoacid phosphate and used as an extreme pressure additive in lubricating grease.

I claim as my invention:

1. The reaction product formed by the condensation at a temperature of from about 175° F. to about 500° F. of (a) polyamine containing at least two primary nitrogens or at least two secondary nitrogens or a mixture of at least one primary nitrogen and at least one secondary nitrogen, (b) polyhalopolyhydropolycyclicdicarboxylic acid, corresponding anhydride or organic ester, said acid defined as hereinafter set forth, and (c) halogen-free dicarboxylic acid or its corresponding anhydride or organic ester, said reactants being reacted in proportions of 1 to 2 basic equivalents per 1 to 2 acidic equivalents, and said polyhalopolyhydropolycyclicdicarboxylic acid being of the following structural formula:

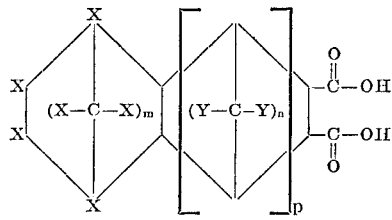

wherein $x$ is halogen, hydrogen, or alkyl of from one to ten carbon atoms, at least two of the X's being halogen, Y is halogen, hydrogen or alkyl of from one to ten carbon atoms, *m* is an integer of from one to four, *n* ranges from zero to four and *p* ranges from zero to four.

2. The reaction product of claim 1 wherein said polyhalopolyhydropolycyclicdicarboxylic acid or anhydride is 5,6,7,8,9,9 - hexachloro - 1,2,3,4,4a,5,8,8a-octahydro-5,8-methano-2,3-naphthalenedicarboxylic acid or anhydride.

3. The reaction product of claim 1 wherein said polyhalopolyhydropolycyclicdicarboxylic acid or anhydride is 5,6,7,8,9,9 - hexachloro - 1,2,3,4,4a,5,8,8a - octahydro-1,4,5,8- - dimethano - 2,3 - naphthalenedicarboxylic acid or anhydride.

4. The reaction product of claim 1 wherein said polyhalopolyhydropolycyclicdicarboxylic acid or anhydride is 1,4,5,6,7,7 - hexachloro-bicyclo - (2.2.1)-5-heptene-2,3-dicarboxylic acid or anhydride.

5. The reaction product of claim 1 wherein said polyamine is an alkylene polyamine containing at least two primary nitrogen atoms.

6. The reaction product of claim 1 wherein said polyamine is an alkylene polyamine containing at least one primary nitrogen and at least one secondary nitrogen atom.

7. The reaction product of claim 1 wherein said polyamine contains at least two secondary nitrogen atoms.

8. The reaction product of claim 1 wherein said halogen-free dicarboxylic acid anhydride is an alkenyl-acid anhydride.

9. The reaction product of claim 8 wherein said alkenyl-acid anhydride is dodecenyl-succinic anhydride.

10. The reaction product of claim 8 wherein said alkenyl-acid anhydride contains from 40 to 80 carbon atoms in said alkenyl.

11. The reaction product of claim 10 wherein said alkenyl-acid anhydride is a polyolefin-acid anhydride.

12. The reaction product of claim 1 wherein said halogen-free dicarboxylic-acid anhydride is maleic anhydride.

13. An organic substance selected from the group consisting of fuel, lubricating oil, grease and plastic improved in one or more properties of stability against oxidation, corrosion, detergency, extreme pressure properties and flame-proofing properties containing a stabilizing concentration of the reaction product of claim 1.

14. The organic substance of claim 13 being fuel improved in one or more properties of stability against oxidation, corrosion and detergency, and said halogen-free acid being an aliphatic substituted dicarboxylic acid containing from 4 to 80 carbon atoms in the aliphatic substitution.

15. The organic substance of claim 13 being lubricating oil or grease improved in one or more properties of stability against oxidation, corrosion, detergency and extreme pressure properties, and said halogen-free acid being an aliphatic substituted dicarboxylic acid containing from 4 to 80 carbon atoms in the aliphatic substitution.

16. The organic substance of claim 13 being plastic improved in one or more properties of stability against oxidation and flame-proofing properties, and said halogen-free acid being an aliphatic substituted dicarboxylic acid containing from 4 to 80 carbon atoms in the aliphatic substitution.

References Cited

UNITED STATES PATENTS

| | | | |
|---|---|---|---|
| 3,208,939 | 9/1965 | Latos et al. | 252—51.5 A |
| 3,362,906 | 1/1968 | Cyba | 252—51.5 R |
| 3,371,097 | 2/1968 | Cyba | 252—51.5 R |
| 3,542,805 | 11/1970 | Cyba | 252—401 X |

DANIEL E. WYMAN, Primary Examiner

W. J. SHINE, Assistant Examiner

U.S. Cl. X.R.

44—63, 71; 252—78, 392, 403; 260—45.8 N, 326 C